(12) United States Patent
Giaretta et al.

(10) Patent No.: US 9,762,478 B2
(45) Date of Patent: *Sep. 12, 2017

(54) METHOD AND APPARATUS FOR PCC ENHANCEMENT FOR FLOW BASED MOBILITY

(71) Applicant: QUALCOMM Incorporated, San Diego, CA (US)

(72) Inventors: Gerardo Giaretta, Monteviale (IT); Georgios Tsirtsis, London (GB); Haipeng Jin, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,214

(22) Filed: Sep. 3, 2015

(65) Prior Publication Data

US 2016/0254993 A1    Sep. 1, 2016

Related U.S. Application Data

(63) Continuation of application No. 12/480,074, filed on Jun. 8, 2009, now Pat. No. 9,131,425.

(Continued)

(51) Int. Cl.
*H04L 12/54* (2013.01)
*H04L 12/721* (2013.01)
(Continued)

(52) U.S. Cl.
CPC .......... *H04L 45/38* (2013.01); *H04L 12/5692* (2013.01); *H04L 45/02* (2013.01);
(Continued)

(58) Field of Classification Search
CPC ............. H04L 12/5692; H04L 12/5695; H04L 45/30–45/308; H04L 47/20;
(Continued)

(56) References Cited

U.S. PATENT DOCUMENTS 6,507,567 B1   1/2003  Willars
6,587,457 B1   7/2003  Mikkonen
(Continued)

FOREIGN PATENT DOCUMENTS

EP    1998584 A1   12/2008
EP    2012473 A1    1/2009
(Continued)

OTHER PUBLICATIONS

C. Larsson H. Levkowetz H. Mahkonen T. Kauppinen Ericsson, "A Filter Rule Mechanism for Multi-access Mobile IPv6", draft-larsson-monami6-filter-rules-02.txt, IETF, Mar. 5, 2007.*

(Continued)

*Primary Examiner* — Timothy J Weidner

(57) ABSTRACT

Systems and methods are described that facilitate multiple registrations and flow based mobility in a wireless communication network. A flow routing component can be included in a mobile device, home agent/p-gateway, or a policy and charging rules function server that determines the manner in which to route one or more IP flows through a set of network access entry points. The flow routing component can determine the routing based on a set of policies and/or network data, such as quality of service requirements, bandwidth requirements, network congestion, currently active IP flows, and so forth.

22 Claims, 14 Drawing Sheets

Related U.S. Application Data

(60) Provisional application No. 61/059,935, filed on Jun. 9, 2008.

(51) Int. Cl.

| | | |
|---|---|---|
| *H04L 12/725* | (2013.01) | |
| *H04W 40/02* | (2009.01) | |
| *H04W 80/04* | (2009.01) | |
| *H04L 12/751* | (2013.01) | |
| *H04L 12/813* | (2013.01) | |
| *H04L 12/851* | (2013.01) | |
| *H04L 29/12* | (2006.01) | |
| *H04W 88/14* | (2009.01) | |
| *H04L 12/911* | (2013.01) | |

(52) U.S. Cl.
CPC ............ *H04L 45/302* (2013.01); *H04L 47/20* (2013.01); *H04L 47/24* (2013.01); *H04L 47/70* (2013.01); *H04L 61/2007* (2013.01); *H04W 40/02* (2013.01); *H04W 80/04* (2013.01); *H04W 88/14* (2013.01)

(58) Field of Classification Search
CPC ... H04L 47/24–47/2491; H04L 47/72–47/728; H04L 61/2007; H04W 36/00; H04W 40/00; H04W 72/04; H04W 76/00; H04W 80/04–80/045; H04W 88/14; H04W 36/005–36/385; H04W 40/005–40/38; H04W 76/002–76/068
See application file for complete search history.

(56) References Cited

U.S. PATENT DOCUMENTS

| | | | |
|---|---|---|---|
| 6,738,361 | B1 | 5/2004 | Immonen et al. |
| 7,319,691 | B2 | 1/2008 | Qing et al. |
| 9,131,425 | B2 * | 9/2015 | Giaretta ............... H04L 12/5692 |
| 2003/0095523 | A1 | 5/2003 | Korus et al. |
| 2004/0095912 | A1 | 5/2004 | Gao et al. |
| 2004/0102194 | A1 | 5/2004 | Naghian et al. |
| 2004/0109439 | A1 | 6/2004 | Kiss et al. |
| 2004/0184452 | A1 | 9/2004 | Huotari et al. |
| 2006/0045076 | A1 | 3/2006 | Lim |
| 2006/0083193 | A1 | 4/2006 | Womack et al. |
| 2008/0046963 | A1 | 2/2008 | Grayson et al. |
| 2008/0137615 | A1 * | 6/2008 | Park ..................... H04L 45/302 370/332 |
| 2008/0159241 | A1 | 7/2008 | Alfano et al. |
| 2008/0186925 | A1 | 8/2008 | Cheng et al. |
| 2009/0029708 | A1 | 1/2009 | Iwata |
| 2009/0141625 | A1 | 6/2009 | Ghai et al. |
| 2009/0300207 | A1 | 12/2009 | Giaretta et al. |
| 2010/0027509 | A1 | 2/2010 | Velev et al. |
| 2010/0208698 | A1 | 8/2010 | Lu et al. |
| 2011/0090794 | A1 | 4/2011 | Cherian et al. |
| 2011/0286384 | A1 | 11/2011 | Sugimoto et al. |
| 2011/0286395 | A1 | 11/2011 | Liebsch et al. |
| 2011/0310906 | A1 | 12/2011 | Stenfelt et al. |
| 2012/0026933 | A1 | 2/2012 | Aso et al. |

FOREIGN PATENT DOCUMENTS

| | | | |
|---|---|---|---|
| JP | 11509992 | A | 8/1999 |
| JP | 2005039733 | A | 2/2005 |
| JP | 2005057551 | A | 3/2005 |
| JP | 2005244525 | A | 9/2005 |
| JP | 2005252493 | A | 9/2005 |
| JP | 2006054841 | A | 2/2006 |
| JP | 2008524670 | A | 7/2008 |
| JP | 2008538475 | A | 10/2008 |
| JP | 2009540627 | A | 11/2009 |
| KR | 100819055 | B1 | 4/2008 |
| RU | 2271614 | | 3/2006 |
| RU | 2295201 | C1 | 3/2007 |
| RU | 2315436 | C2 | 1/2008 |
| WO | 9619887 | A1 | 6/1996 |
| WO | 2006052400 | A1 | 5/2006 |
| WO | 2006114712 | A1 | 11/2006 |
| WO | 2007099700 | A1 | 9/2007 |
| WO | 2007145371 | A1 | 12/2007 |
| WO | 2009068076 | A1 | 6/2009 |

OTHER PUBLICATIONS

3GPP: "3rd Generation Partnership Project; Technical Specification Group Services and System Aspects; Architecture enhancements for non-3GPP accesses (Release8)" 3GPP Draft; 23.402-8.0.0, 3rd Generation Partnership Project (3GPP), Mobile Competence Centre ; 650, Route Des Lucioles ; F-06921 Sophia-Antipolis Cedex ; France, vol. SA WG3, No. Sophia; Feb. 1, 2008, Feb. 1, 2008 (Feb. 1, 2008), XP050282133 [retrieved on .Feb. 1, 2008] the whole document.

Deering S., et al., "Internet Protocol, Version 6 (IPv6) Specification", Networking Working Group, IETF, RFC 2460, Dec. 1998, pp. 1-39.

International Search Report and Written Opinion—PCT/US2009/046789, International Search Authority—European Patent Office—dated Oct. 28, 2009.

Korhonen Teliasonera V Devarapalli Azaire G Giaretta Telecom Italia R Koodli Nokia J: "IP Mobility and Policy Control; draft-korhonen-mobopts-mobility-policy-00.txt" IETF Standard-Working-Draft, Internet Engineering Task Force, IETF, CH,—Oct. 1, 2007 (Oct. 1, 2007), XP015050091 ISSN: 0000-0004 pp. 5-14.

Larsson H Levkowetz H Mahkonen T Kauppinen Ericsson C: "A Filter Rule Mechanism for Multi-access Mobile IPv6; draft-larsson-monami6-filter-rules-02.txt" IETF Standard-Working-Draft, Internet Engineering Task Force, IETF, CH, No. 2, Mar. 5, 2007 (Mar. 5, 2007), XP015050112 ISSN: 0000-0004 pp. 3-11; figure 2.

Mitsuya Keio University K Tasaka KDDI R&D Lab R Wakikawa Keio University R Kuntz University of Tokyo K: "A Policy Data Set for Flow Distribution; draft-mitsuya-monami6-flow-distribution-policy-04.txt" IETF Standard-Working-Draft, Internet Engineering Task Force, IETF, CH, No. 4, Aug. 2, 2007 (Aug. 2, 2007), XP015052013 ISSN: 0000-0004 p. 4-p. 10, line 4.

Multi access PDN connectivity and IP flow mobility (Release 9), v 1.2.0 3GPP Draft; 23861-120, 3rd Generation Partnership Project (SGPP), Mobile Competence Centre ; 650, Route Des Lucioles ; F-06921 Sophia-Antipolis Cedex ; France, [Online] May 2009 (May 2009), XP050355365 [retrieved on Jul. 24, 2009] pp. 12-39.

Taiwan Search Report—TW098119258—TIPO—dated Aug. 15, 2012.

Taiwan Search Report—TW098119258—TIPO—Jun. 28, 2013.

Digital cellular telecommunications system (Phase 2+); Universal Mobile Telecommunications System (UMTS); Policy and charging control architecture (3GPP TS 23.203 version 7.6.0 Release 7); ETSI TS 123 203 ETSI Standards, Lis, Sophia Antipolis Cedex, France, Apr. 2008, pp. 1-73.

Soliman Elevate Technologies N M0NTAVONT IT/Telecom Bretagne N Fikouras K Kuladinithi University of Bremen H: "Flow Bindings in Mobile IPv6 and Nemo Basic Support;" draft-ietf-mext-flow-binding-00.txt Flow Bindings in Mobile IPV6 and Nemo Basic Support; Draft-IETF-MEXT-Flow-Binding-00.txt, Internet Engineering Task Force, IETF; Standard Working Draft, Internet society (ISOC) 4, Rue Des Falaises CH- 1205 Geneva, Switzerland, vol. mext, May 16, 2008, pp. 1-32.

* cited by examiner

METHOD AND APPARATUS FOR PCC ENHANCEMENT FOR FLOW BASED MOBILITY

CLAIMS OF PRIORITY

The present application for patent claims priority to Provisional Application No. 61/059,935 entitled "METHOD AND APPARATUS FOR PCC ENHANCEMENT FOR FLOWS BASED MOBILITY" filed Jun. 9, 2008, and assigned to the assignee hereof and hereby expressly incorporated by reference herein.

The present application for patent is a continuation of U.S. patent application Ser. No. 12/480,074, titled "METHOD AND APPARATUS FOR PCC ENHANCEMENT FOR FLOW BASED MOBILITY," filed Jun. 8, 2009, which issued on Sep. 8, 2015 as U.S. Pat. No. 9,131,425 and which is assigned to the assignee hereof and hereby expressly incorporated by reference herein.

BACKGROUND

Field

The present disclosure relates generally to wireless communications, and more specifically but not exclusively to various techniques for multiple registrations and flow based mobility in wireless communication networks.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with pcc enhancement for flow based mobility. According to related aspects, a method for internet protocol flow routing in a communication network is provided. The method includes obtaining a set of network data, determining at least one policy for routing internet protocol flows based at least in part on the set of network data, and determining routing for at least one internet protocol flow through at least one access network based at least in part on the network data and policies.

Another aspect relates to a wireless communication apparatus. The wireless communication apparatus includes. At least one processor configured to route internet protocol flows in a communication network, including a first module for acquiring a set of network data, wherein the network data includes at least one of quality of service requirements, available radio access technology, bandwidth requirements, active internet protocol flows, active quality of service rules, a home address, or a care of address, a second module for at least one of selecting from a set or dynamically determining one or more policies for internet protocol flow routing based at least in part on the network data, and a third module for determining a set of internet protocol flow routes via at least one of mobile device, a p-gateway, or a policy and rules charging function server.

Yet another aspect relates to a computer program product, which can have a computer-readable medium that includes a first set of codes for causing a computer to obtain a set of network data, wherein the network data includes at least one of quality of service requirements, available radio access technology, bandwidth requirements, active internet protocol flows, active quality of service rules, a home address, or a care of address, a second set of codes for causing the computer to at least one of dynamically determine or select one or more policies for internet protocol flow routing based at least in part on the network data, and a third set of codes for causing the computer to determine a set of internet protocol flow routes via at least one of mobile device, a p-gateway, or a policy and rules charging function server.

Still another aspect relates to an apparatus that includes means for collecting a set of network data, means for at least one of selecting from a set or dynamically determining one or more policies for internet protocol flow routing based at least in part on the network data, and means for determining a set of internet protocol flow routes via at least one of mobile device, a p-gateway, or a policy and rules charging function server.

Moreover an additional aspect relates to apparatus. The apparatus can include a flow routing component that determines routes for one or more internet protocol flows through one or more access network entry points based on a set of network data, an acquisition component that obtains one or more pieces of network data, and a policies component that at least one of selects from a set of policies, or dynamically determines one or more policies for internet protocol flow routing based at least in part on the network data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
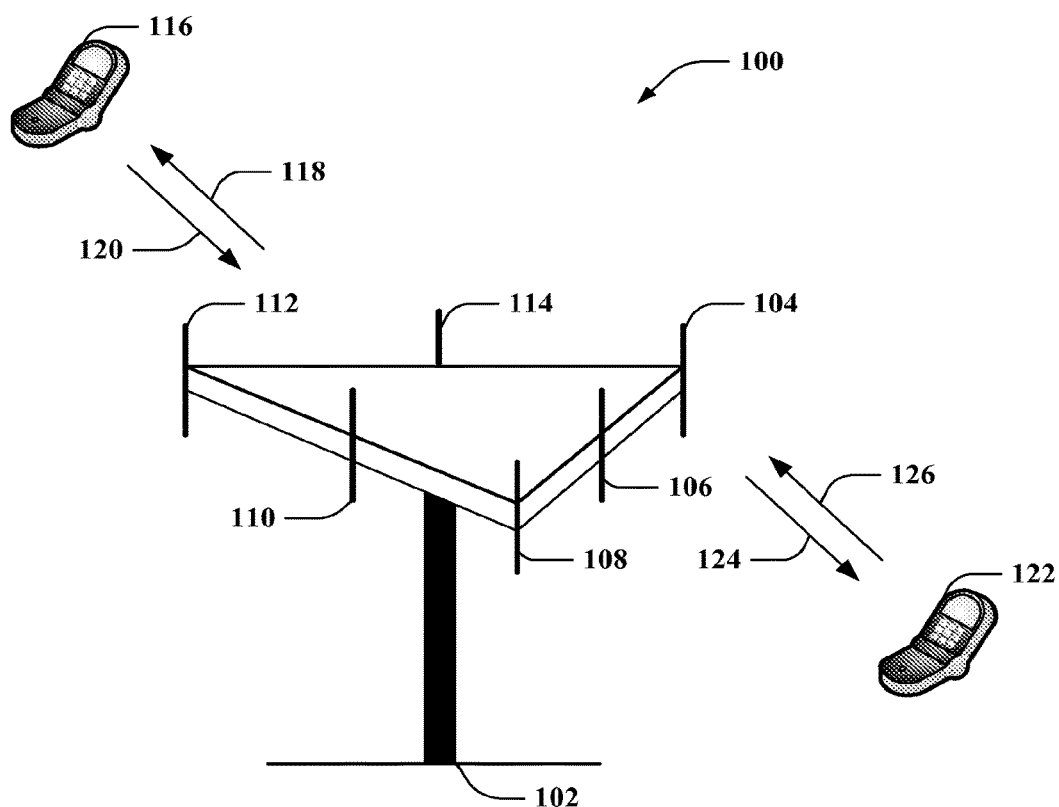
FIG. 1 illustrates an example multiple access wireless communication system in accordance with an aspect of the subject specification.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc.

UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beam-forming to improve signal-to-noise ratio of forward links 118 and 124 for mobile devices 116 and 122. This can be provided by using a precoder to steer signals in desired directions, for example. Also, while base station 102 utilizes beam-forming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

Figure 2:
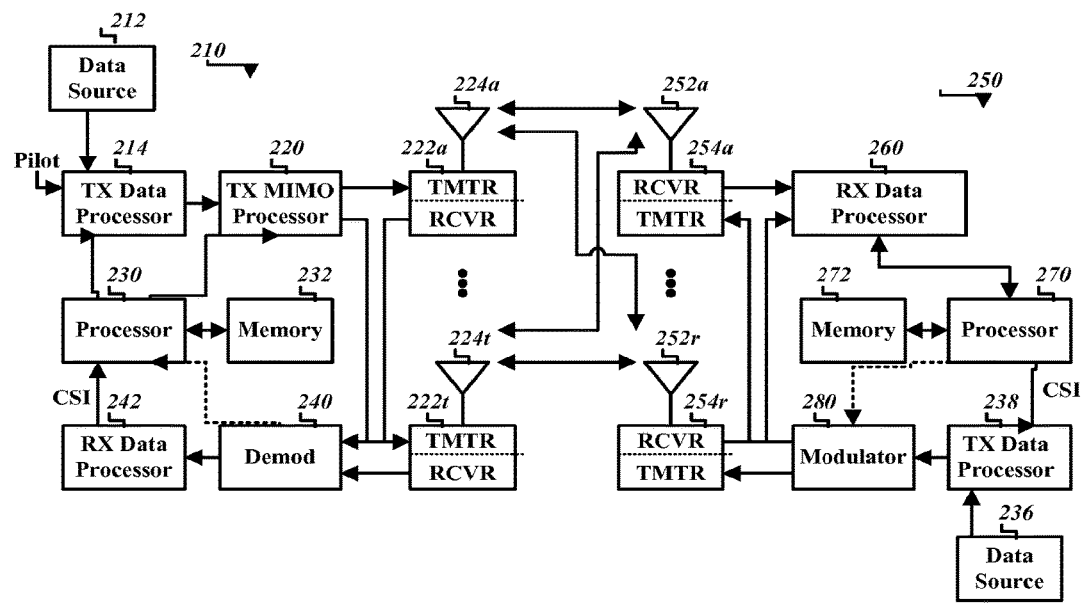
FIG. 2 illustrates a general block diagram of a communication system in accordance with an aspect of the subject specification.

FIG. 2 is a block diagram of a transmitter system 210 (also known as the access point) and a receiver system 250 (also known as access terminal) in a MIMO system 200. At the transmitter system 210, traffic data for a number of data streams is provided from a data source 212 to a transmitter (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beam-forming weights then processes the extracted message.

Figure 3:
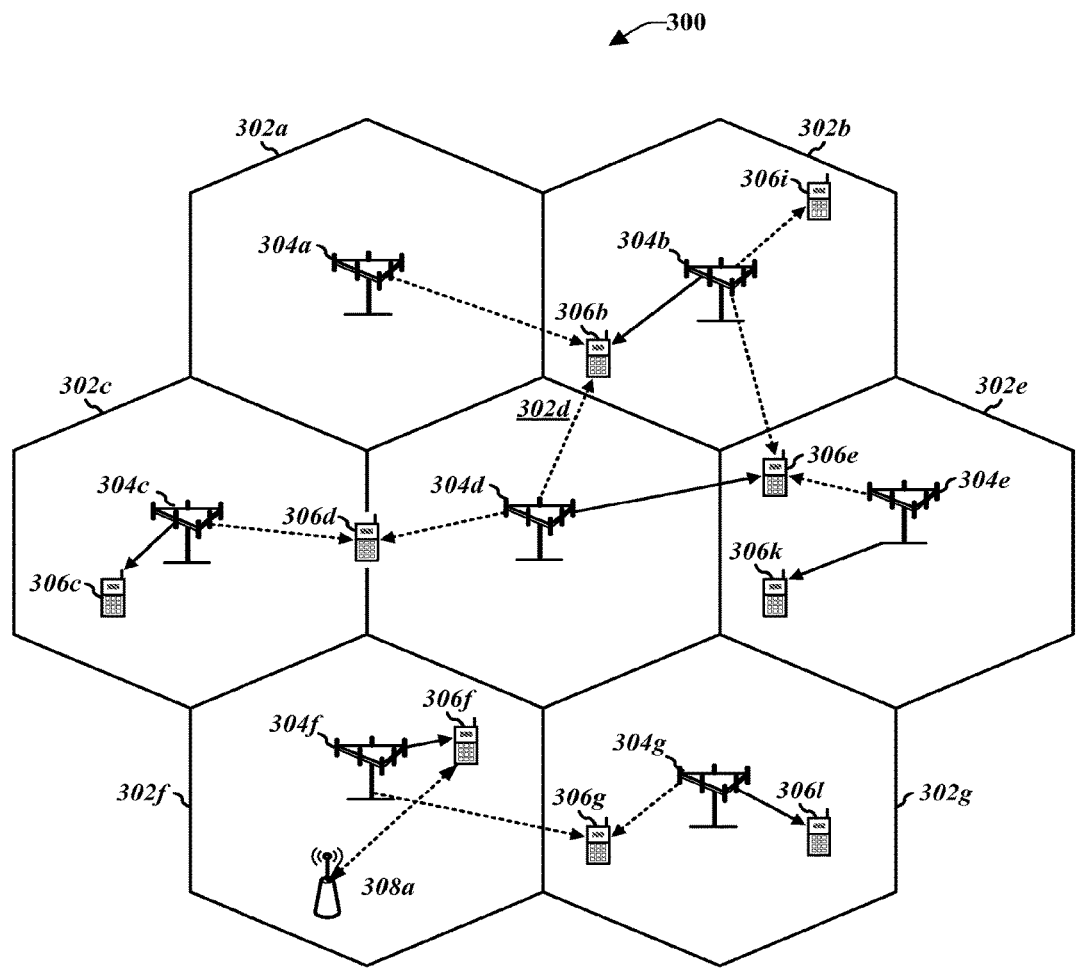
FIG. 3 illustrates an example wireless communication system in accordance with an aspect of the subject specification.

FIG. 3 illustrates an example wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. to serve one or more frequencies). Various access terminals (ATs) 306, including ATs 306a-306k, also known interchangeably as user equipment (UE) or mobile stations, are dispersed throughout the system. Each At 306 may communicate with one or more APs 304 on a forward link (FL) and/or a reverse link (RL) at a given moment, depending upon whether the At is active and whether it is in soft handoff, for example. The wireless communication system 300 may provide service over a large geographic region, for example, macro cells 302a-302g may cover a few blocks in a neighborhood.

In addition, the ATs 306 can support multiple radio technologies, and connect to one or more radio technologies simultaneously. For example, the At 306f can support communication via a mobile wireless communication network, such as LTE (as previously discussed), and a wireless local area network (WLAN). The At 306f can simultaneously connect to the mobile wireless communication network via the AP 304f, and the WLAN via a WLAN access point 308a. When the At 306f is simultaneously connected to multiple networks, each network can be used for separate IP flows. For instance, the connection between the At 306f and the AP 304f can be used for voice communication, while the connection to the WLAN 308a can be used for file downloads. The innovation described infra details a plurality of mechanisms for routing multiple IP flows through multiple access networks. It is to be appreciated that the foregoing represents but a single example, and a plurality of network types are possible.

Figure 4:
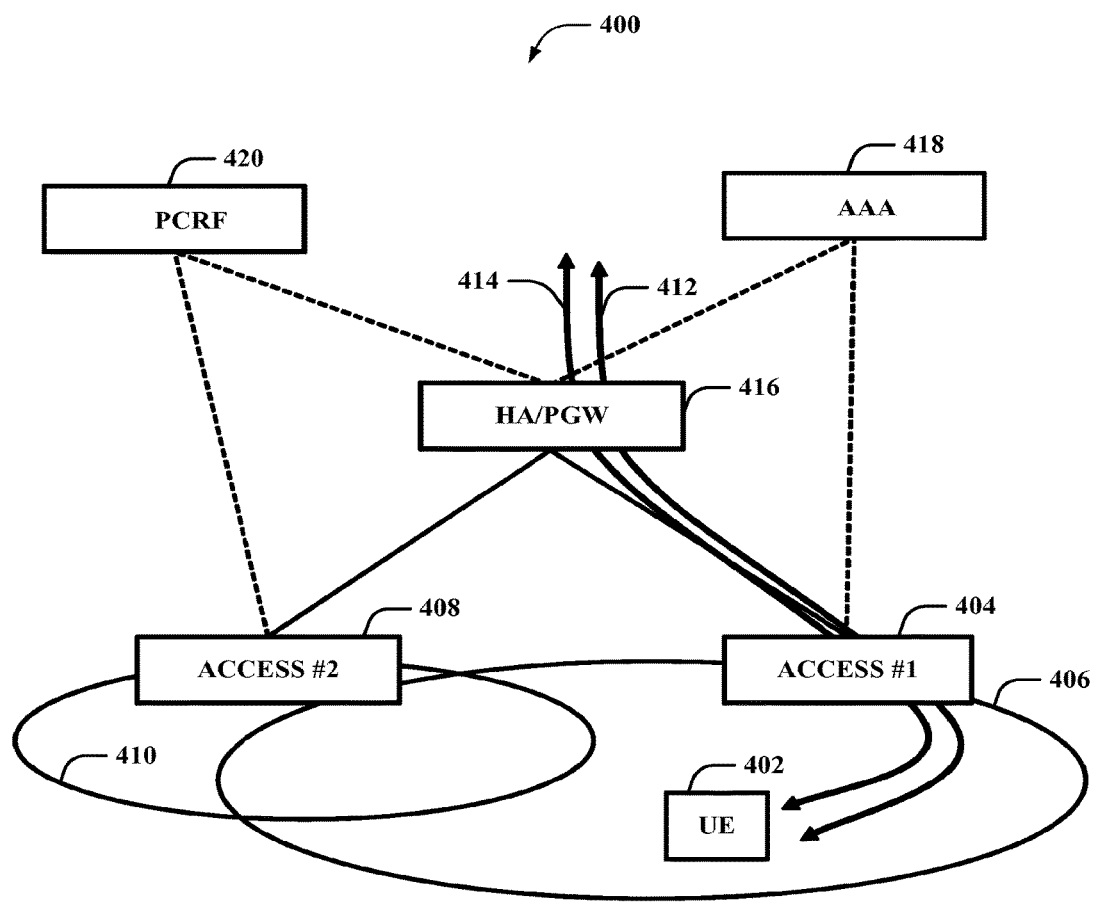
FIG. 4 is an example diagram illustrating internet protocol flow based mobility in accordance with the subject specification.

Turning now to FIG. 4, an example diagram illustrating internet protocol flow based mobility is shown in accordance with an aspect of the subject innovation. Depicted is a wireless communication system 400 that includes a UE 402. The UE 402 can be most any suitable device for communicating over a wireless communication system, including but not limited to cellular phones, smart phones, laptops, handheld communication devices, handheld computing devices, satellite radios, global positioning systems, PDAs, and so forth. Many wireless standards bodies are now considering data exchanges as internet protocol (IP) flows, wherein internet protocol is used to transfer data between network nodes. Essentially, the IP flows consist of series of IP packets transmitted between network nodes. One flow is typically identified by a common IP header, for example, if the flow is going to the same IP address or destination then it can be classified as one IP flow.

Returning to the illustration, the wireless communication system 400 further includes a first access network 404 having a serving area 406, and a second access network 408 having a serving area 410. For example, the first access network 404 can be a LTE network, and the second access network 408 can be a WLAN. The UE 402 is illustrated as having a first IP flow 412 and a second IP flow 414. Both IP flows 412 and 414 are currently routed through the first access network 404, because the UE 402 is located in the serving area 406 of the first access network 404. In other words, based on the physical location of the UE 402, the first access network 404 is currently the only network available for use by the UE 402. The access networks 404 and 408 communicate the IP flows to a Home Agent (HA) 416, which is also known as a P-Gateway (PGW). The HA/PGW 416 is a network entry point that enables the UE 402 to communicate with other networks, devices, and/or virtually any point on the internet.

In addition, the HA 416 is typically responsible for assigning a Home Address (HoA) to an attached UE. The UE is subsequently known by its HoA, and when another device, or network entity attempts to communicate with the UE it will send a packet to the HoA assigned to the particular UE. However, when a UE attaches to different access networks it also is assigned Care of Address (CoA) (e.g., a local IP address) from the access network (e.g., access network 404 or 408). The UE will try to register each CoA with the HA 416. Discussed in greater detail below are mechanisms and techniques for registering multiple CoAs with the HA 416.

An authorization, authentication, and accounting (AAA) server 418 authorizes the UE 402 based on a set of credentials, such as a user identity. Furthermore, a communication session is established with a policy and charging rules function (PCRF) server 420, wherein the PCRF 420 can manage the connection with the UE 402. For example, the PCRF 420 can prescribe the type of charging used, the quality of service (QoS), and so forth.

Figure 5:
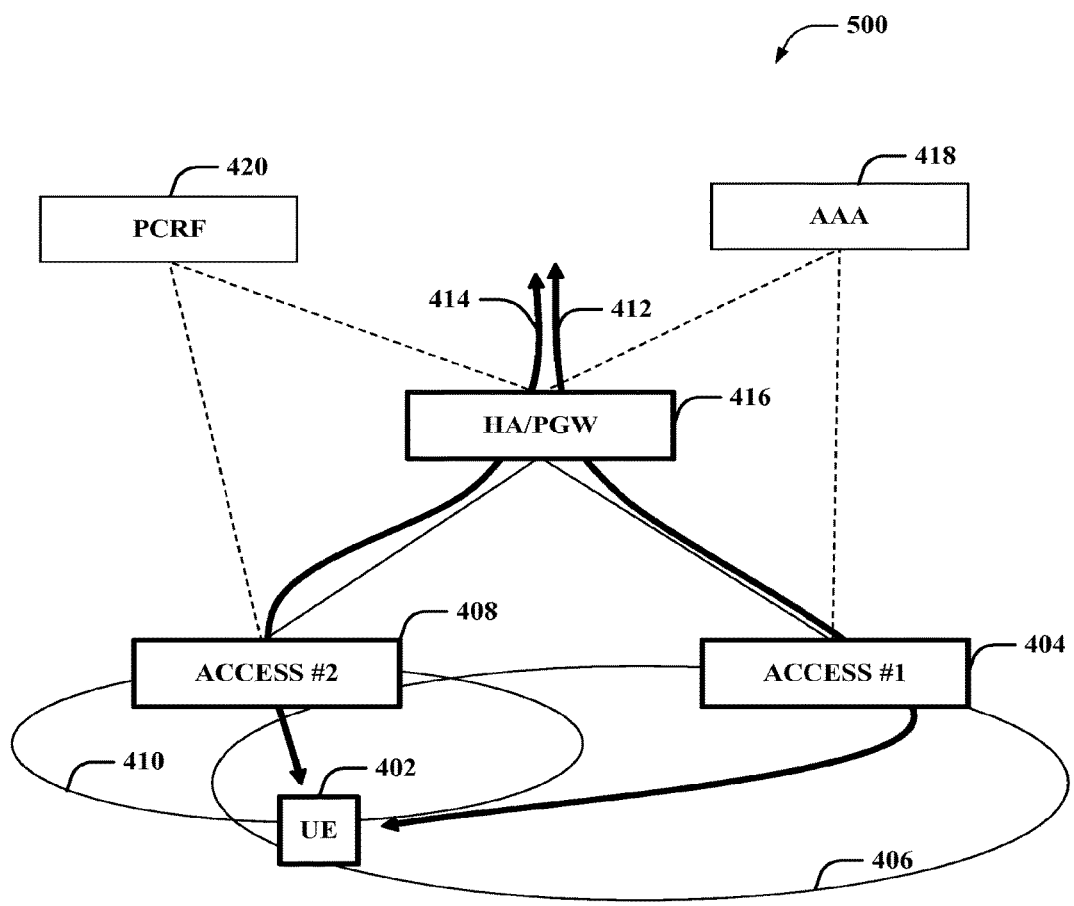
FIG. 5 is an example diagram illustrating internet protocol flow based mobility in accordance with the subject specification.

Referring to FIG. 5, the wireless communication system of FIG. 4 is illustrated at a second time where the UE 402 has moved, relocated, or otherwise been repositioned. For example, the UE 402 can be a mobile phone, wherein a user is traveling (e.g., walking, driving, etc.) while using (e.g., talking on the phone, downloading content, etc.) the mobile phone. As illustrated, the UE 402 is situated in an overlapping region of the serving area 406 for the first access network 404, and the serving area 410 of the second access network 408. Consequently, both access networks 404 and 408 are available for use by the UE 402, and as discussed previously, if the UE 402 supports multiple radio technologies then the UE 402 can connect to both access networks 404 and 408 at the same time.

After communication has been established with the second access network 408 (discussed supra), then one or more IP flows (e.g., 412 or 414) can be routed through the second access network 408. Routing of the IP flows 412 and 414 can be based on a plurality of criteria. For instance, returning to a previous example, where the first access network 404 is a LTE network, and the second access network 408 is a WLAN, the routing of the IP flows can be based on the resources (e.g., QoS) required/desired for the IP flows 412 and 414. If the first IP flow 412 is a voice communication session, then it may be desirable to route it through the LTE network (e.g., access network 404) due to desired QoS performance. In addition, if the second IP flow 414 is a data download, then it may be desirable to route the second flow 414 through the WLAN (e.g., second access network 408), because WLANs typically have greater bandwidth then LTE networks, and data downloads often do not have the same QoS requirements as voice communication. As discussed infra, routing determinations can be made by a plurality of network entities, including but not limited to the UE 402, the HA/PGW 416, or the PCRF 420.

Figure 6:
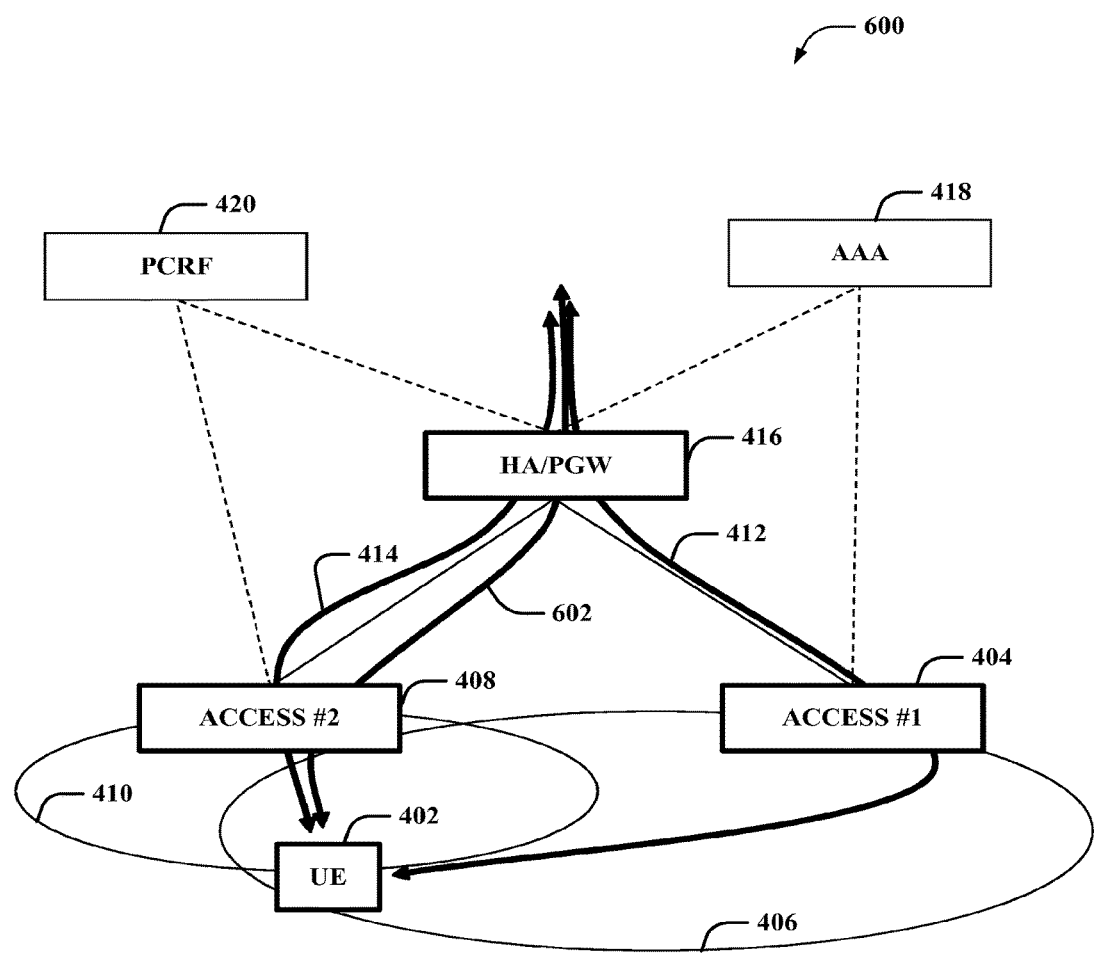
FIG. 6 is an example diagram illustrating internet protocol flow based mobility in accordance with the subject specification.

FIG. 6 illustrates the example wireless communication system 600 of FIGS. 4 and 5 at a third time in accordance with an aspect of the subject innovation. As discussed previously, the UE 402 is depicted as being located in an overlapping region of the serving area 406 for the first access network 404, and the serving area 410 for the second access network 408. The UE 402 supports multiple radio technologies, and consequently can route IP flows through both available access networks 404 and 408 simultaneously. It is to be appreciated that the UE 402 is not limited to two IP flows, for example the UE 402 can add or remove IP flows based on demand, services, etc.

For instance, returning to a prior example, the UE 402 can add a third IP flow 602, and the IP flow 602 can be routed through either access network 404 or 408 based on one or more criteria. For example, if the IP flow 602 consist of high volume traffic, then it may be desirable to route it through the second access network 408, where the second access network 408 is a WLAN (discussed previously). As shown in FIG. 6, both IP flows 414 and 602 can be routed through the second access network 408.

Figure 7:
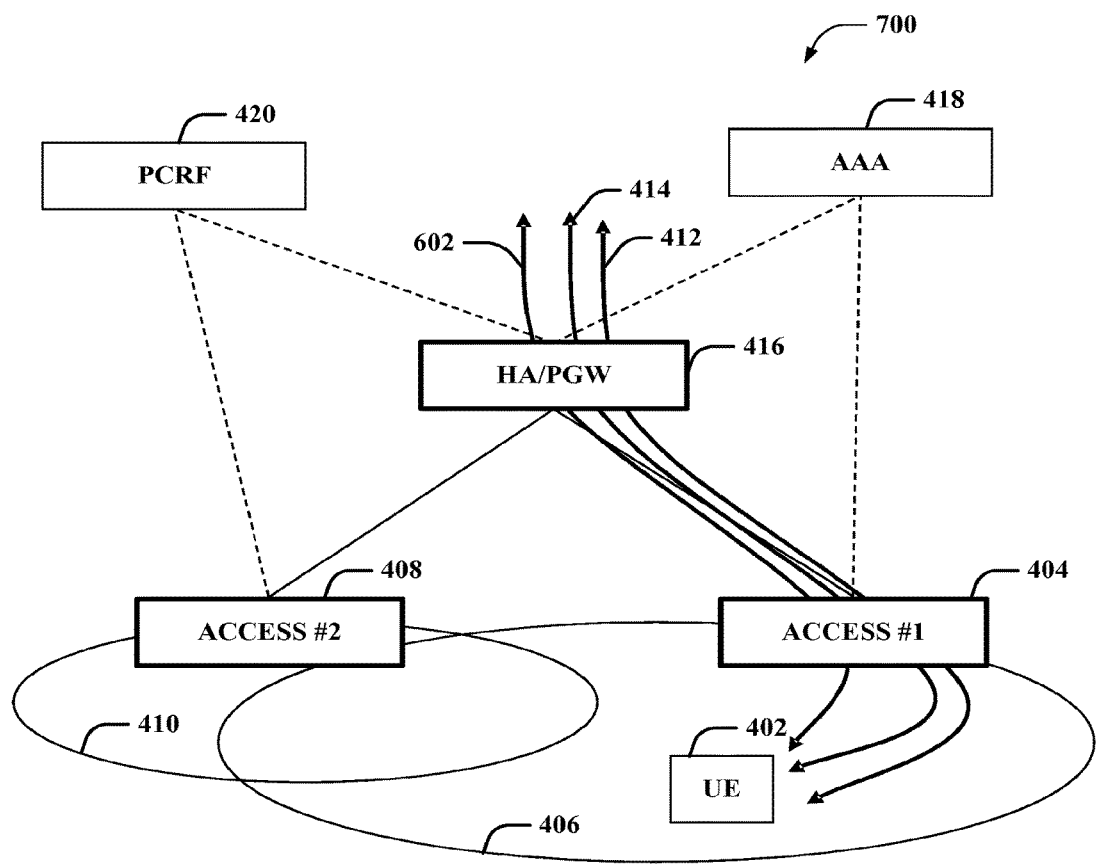
FIG. 7 is an example diagram illustrating internet protocol flow based mobility in accordance with the subject specification.

Turning now to FIG. 7, the example wireless communication system 700 of FIGS. 4-6 is shown at a fourth time in accordance with an aspect of the subject innovation. At the fourth time, the UE 402 has moved out of the overlapping region, and back into the serving area 406 of the first access network 404. As a consequence, the second access network 408 is no longer available to the UE 402. Therefore, each IP flow 412, 414, and 602 associated with the UE 402 are routed via the first access network 404.

Rerouting IP flows can be accomplished via a handover between accesses. Typically, handovers are accomplished to allow a UE to capitalize on the best available signal. However, this innovation provides mechanisms and techniques for UEs to effectuate handovers in order to match IP flows to the most suited access. As discussed previously, the IP flows can be moved from one access to another based on a plurality of criteria, including but not limited to QoS requirements, bandwidth requirements, and so forth. In the previous examples, the IP flows 414 and 602 are transferred from the second access network 408 to the first access network 404 based on the availability of the access networks. It is to be appreciated that foregoing figures have been illustrated for brevity and clarity of explanation and a plurality of embodiments are possible within the scope and spirit of the subject innovation.

Figure 8:
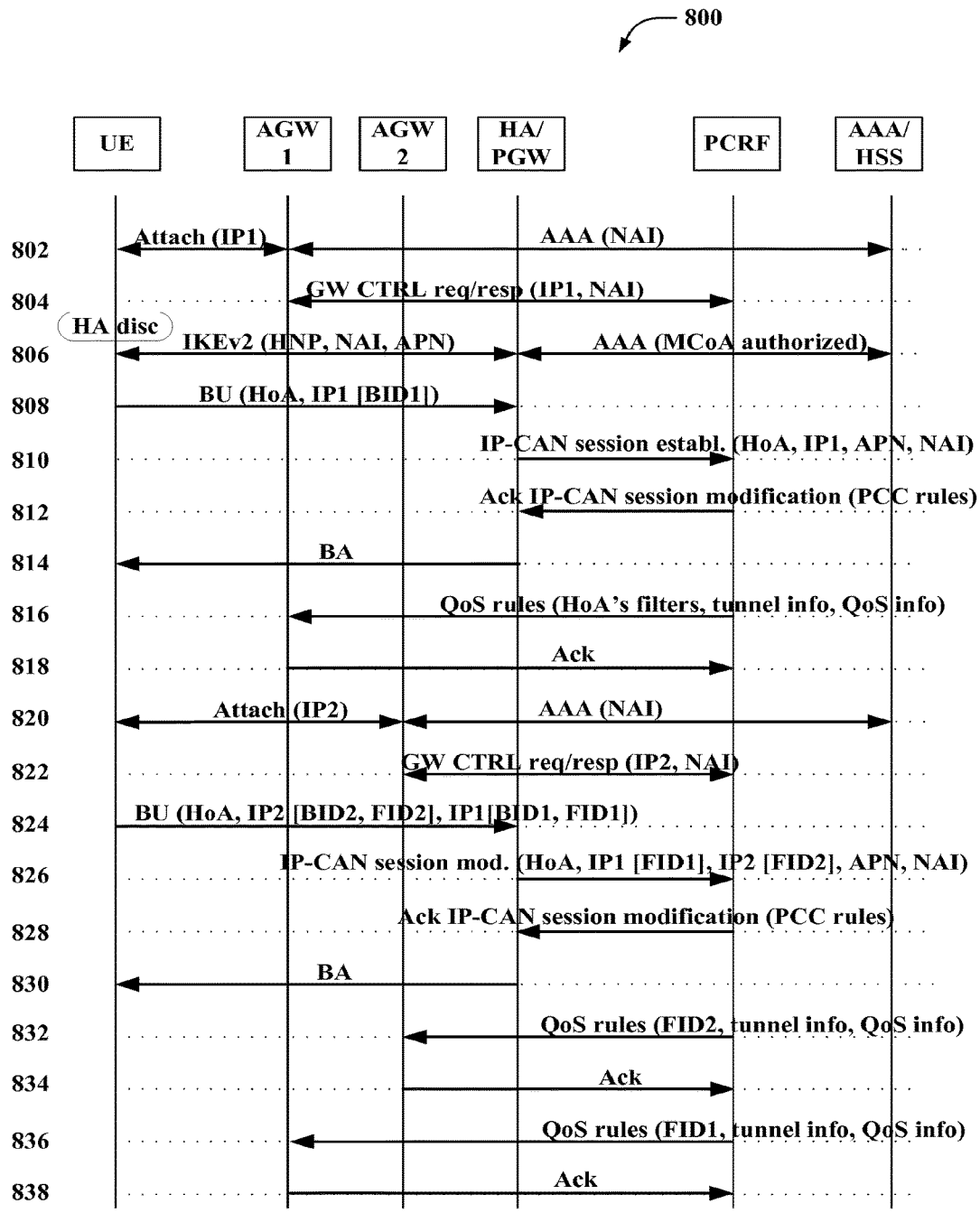
FIG. 8 illustrates an example methodology of registering multiple care of addresses in EPS with filters in binding updates/binding acknowledgements in accordance with an aspect of the subject specification.
Figure 9:
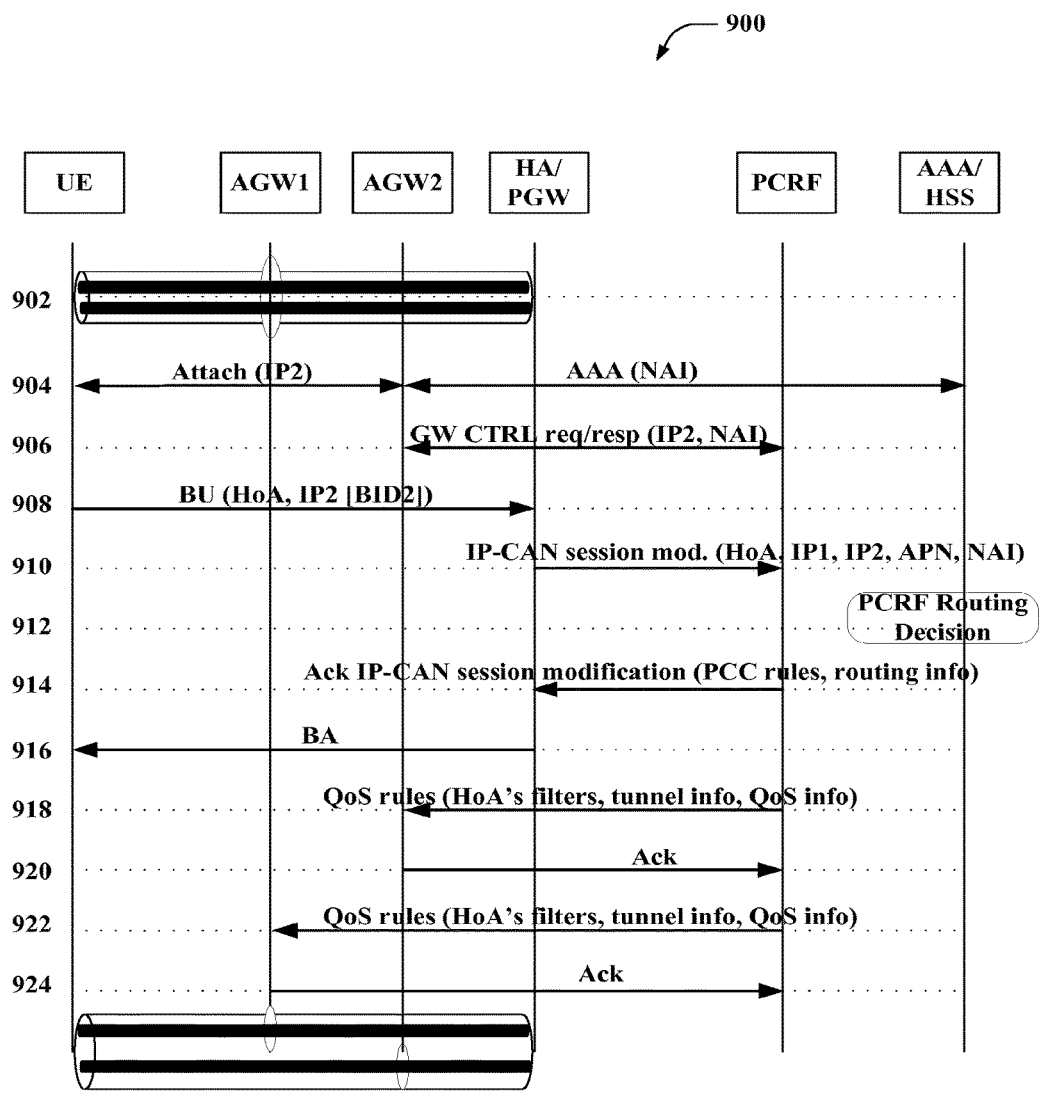
FIG. 9 illustrates an example methodology of registering multiple care of addresses in EPS using a PCRF flow routing approach in accordance with an aspect of the subject specification.
Figure 10:
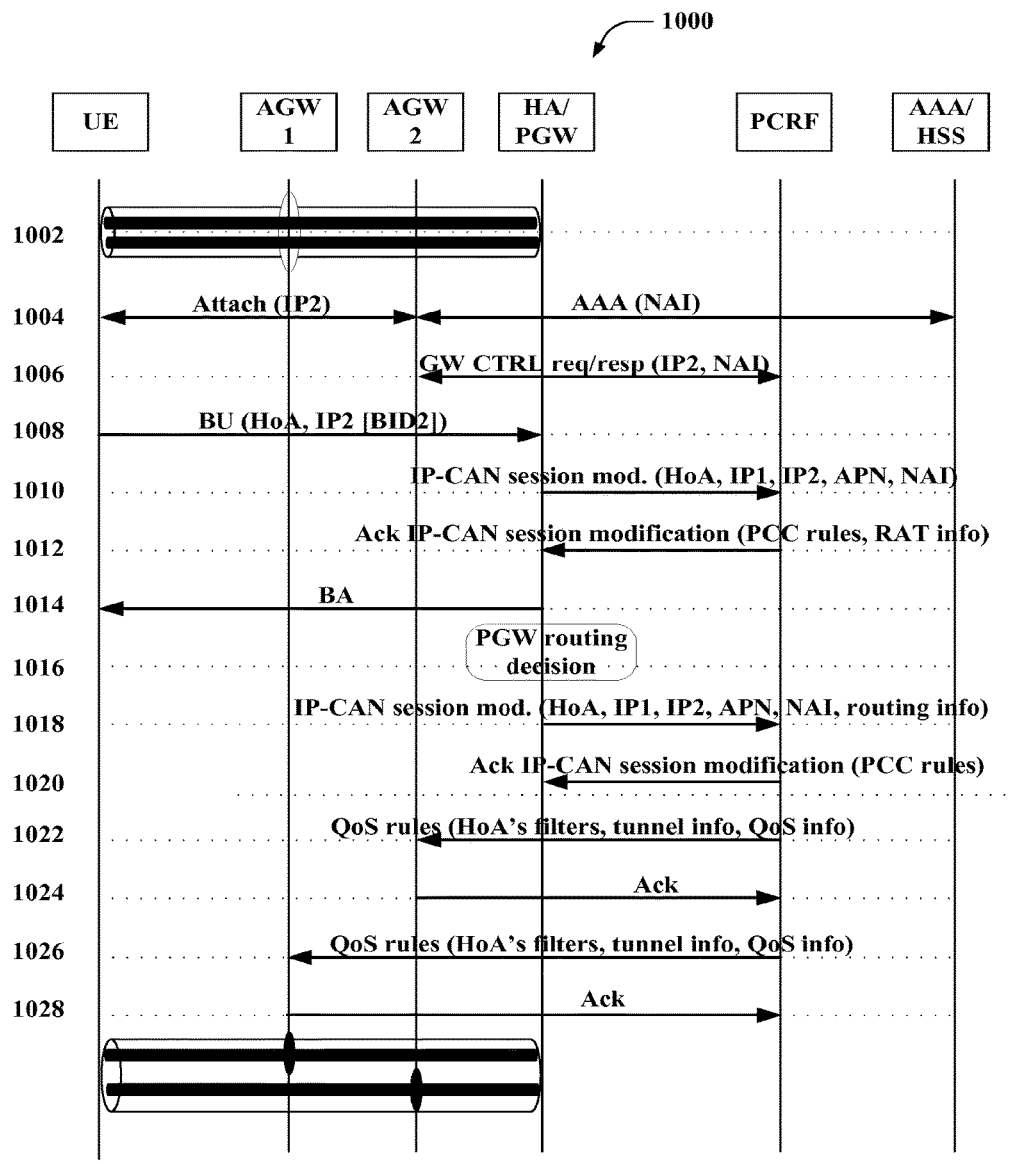
FIG. 10 illustrates an example methodology of registering multiple care of addresses in EPS using a HA/PGW flow routing approach in accordance with an aspect of the subject specification.

In view of the example systems described supra, methodologies that may be implemented in accordance with the disclosed subject matter will be better appreciated with reference to the call flow diagrams of FIGS. 8-10. While for purposes of simplicity of explanation, the methodologies are shown and described as a series of steps, it is to be understood and appreciated that the claimed subject matter is not limited by the order of the steps, as some steps may occur in different orders and/or concurrently with other steps from what is depicted and described herein. Moreover, not all illustrated steps may be required to implement the methodologies described hereinafter.

FIG. 8 illustrates an example methodology of registering multiple care of addresses in EPS with filters in binding updates/binding acknowledgements in accordance with an aspect of the subject innovation. At 802, a UE attaches, connects, or otherwise associates with a first access gateway (AGW 1). The AGW 1 enables the UE to communicate with a first access network (NW1), and the UE is authorized to attach to the AGW 1 by an authorization, authentication, and accounting (AAA) server based on one or more credentials, such as a network asserted identity (NAI). At 804, AGW 1 establishes a session with the policy and charging rules function (PCRF) server. This session can be used to transfer data by the PCRF when it needs to manage the UE's connection to AGW 1.

At 806, the UE is assigned a Home Address (HoA) from the network entry point, wherein the network entry point is a Home Agent (HA) or P-Gateway (PGW). In addition, the HA/PGW authorizes the use of multiple Care of Address (CoA) for the UE with the AAA server. At 808, the UE sends a Binding Update (BU) to the HA/PGW that notifies the HA/PGW to bind the HoA assigned at 806 to the internet protocol address number 1 (IP1) assigned at 802. Additionally or alternatively, the UE can also include a binding identification number (e.g., BID1) to identify this binding as the first binding. At 810, the HA establishes an Internet Protocol Connectivity Access Network (IP-CAN) session with the PCRF. Establishing the IP-CAN session is similar to step 804 in that the HA is establishing a session with PCRF for control of the IP-CAN sessions. The IP-CAN sessions provides all information for PCRF to make decisions regarding the types of services, request, etc. that should be authorized.

At 812, the PCRF sends an acknowledgement of the IP-CAN session, and the policy and charging rules (PCC) to the HA. For example, the PCC can define the type of charging used for a set of services, the quality of service (QoS) to be delivered, and so forth. At 814, the HA/PGW sends a binding acknowledgement (BA) to the UE for the BU of step 808. At 816, using the gateway session established between AGW 1 and the PCRF, the PCRF provides a set of QoS rules to the AGW 1 based on the previously provided PCC rules. At 818, the AGW 1 sends an acknowledgement to the PCRF for the QoS rules obtained at 816.

At 820, the UE associates with a second access gateway (AGW 2) that enables the UE to communicate with a second access network (NW2). In addition, the UE is authorized to attach to the AGW 2 by the AAA server based on a set of credentials, such as the NAI. At 822, the AGW 2 establishes a session with the PCRF server. This session can be used to transfer data by the PCRF when it needs to manage the UE's connection to AGW 2. At 824, since there are multiple IP flows (e.g., IP1 and IP2), the UE tells the network which flow is routed over which access network (e.g., via AGW 1 or AGW 2) by sending a BU to the HA/PGW. Additionally or alternatively, the BU can include a flow identifier number (e.g., FID1 or FID2) that can identify transmissions as belonging to a particular flow. In other words, the UE sends a BU registering IP2 as a second CoA, and determines the flow routing by providing filters for IP1 and IP2.

At 826, the HA/PGW provides IP-CAN session modification information to the PCRF that informs the PCRF which flow (e.g., IP1 or IP2) goes with which IP address. The HA/PGW is providing the filters from 824 to the PCRF, wherein the filters determine how the flows are routed. At 828, the PCRF sends an acknowledgement (ACK) along with a set of PCC rules to the HA/PGW. At 830, the HA/PGW sends a BA to the UE in response to the BU at 824. At 832, the PCRF sends QoS and tunnel information related to IP2 to AGW2, because virtually all the IP packets are tunneled between the UE and the HA/PGW. At 834, the HA/PGW sends an ACK to the PCRF for the information obtained at 832. Similarly, at 836, the PCRF sends QoS and tunnel information related to IP1 to AGW1, and at 838 the AGW 1 sends an ACK to the PCRF for the information obtained at 836.

FIG. 9 illustrates an example methodology of registering multiple care of addresses in EPS using a PCRF flow routing approach in accordance with an aspect of the subject innovation. At 902, the UE has already attached to the AGW 1, a gateway control session has been established (as discussed previously), and the first IP flow (IP1) has been bound to the HoA of the UE. At 904, the UE attaches to AGW 2 for second IP flow (IP2), and the UE is verified by the AAA server. At 906, a gateway control session is established between the AGW 2 and the PCRF. At 908, the UE sends a BU to the HA directing the HA to associate the HoA with IP2. In addition, a BID is specified which identifies the binding as the second binding (e.g., BID2). At 910, the HA sends an IP-CAN session modification to the PCRF (discussed previously).

At 912, the PCRF determines the routing of the IP flows through the access networks (e.g., via AGW 1 or AGW 2). The PCRF is suited to make routing decisions, because it has knowledge of all active flows and related active QoS rules. Also, the PCRF knows the HoA, CoAs, and RATs related to each CoA. At 914, the PCRF sends an Ack to the HA/PGW for the IP-CAN session modification at 910, including a set of PCC rules, and the routing information for each IP flow. At 916, the HA/PGW sends a BA to the UE for the BU at 908. At 918-922, the PCRF sends the QoS rules to each gateway for the corresponding IP flows, along with the tunnel information, and the QoS information.

Referring to FIG. 10, an example methodology of registering multiple care of addresses in EPS using a HA/PGW flow routing approach is illustrated in accordance with an aspect of the subject innovation. At 1002, the UE has previously associated with the AGW 1, a gateway control session has been established, and the first IP flow (IP1) has been bound to the HoA of the UE (as discussed supra). At 1004, the UE associates with the AGW 2 for the second IP flow (IP2), and the UE is verified by the AAA server. At 1006, a gateway control session is established between the AGW 2 and the PCRF. At 1008, the UE sends a BU to the HA/PGW directing the HA/PGW to associate the HoA with IP2. In addition, a BID is specified which identifies the binding as the second binding (e.g., BID2). At 1010, the HA/PGW sends an IP-CAN session modification to the PCRF (discussed previously). At 1012, the PCRF sends an Ack to the HA/PGW for the IP-CAN session modification, including a set of PCC rules, and information regarding the available radio access technologies (RAT). At 1014, the HA/PGW sends a BA to the UE in response to the BU at 1008.

At 1016, the HA/PGW determines the IP flow routing based at least in part on the RAT info provided at 1012. For example, the AGW 1 can be an LTE access network, and the AGW 2 can be a WLAN access network. The HA/PGW can determine the routing based on the characteristics of the IP flows (e.g., bandwidth requirements, QoS requirements, etc.) and the available access technologies. At 1018, the HA/PGW sends an IP-CAN session modification to the PCRF including the routing information, and the PCRF sends an Ack with the relevant PCC rules at 1020. Based on the routing information contained in the IP-Can session modification, the PCRF sends the QoS rules to the AGW 1 and AGW 2, along with HoA's filters for the respective flows, tunnel information, and QoS information at 1022-1028.

Figure 11:
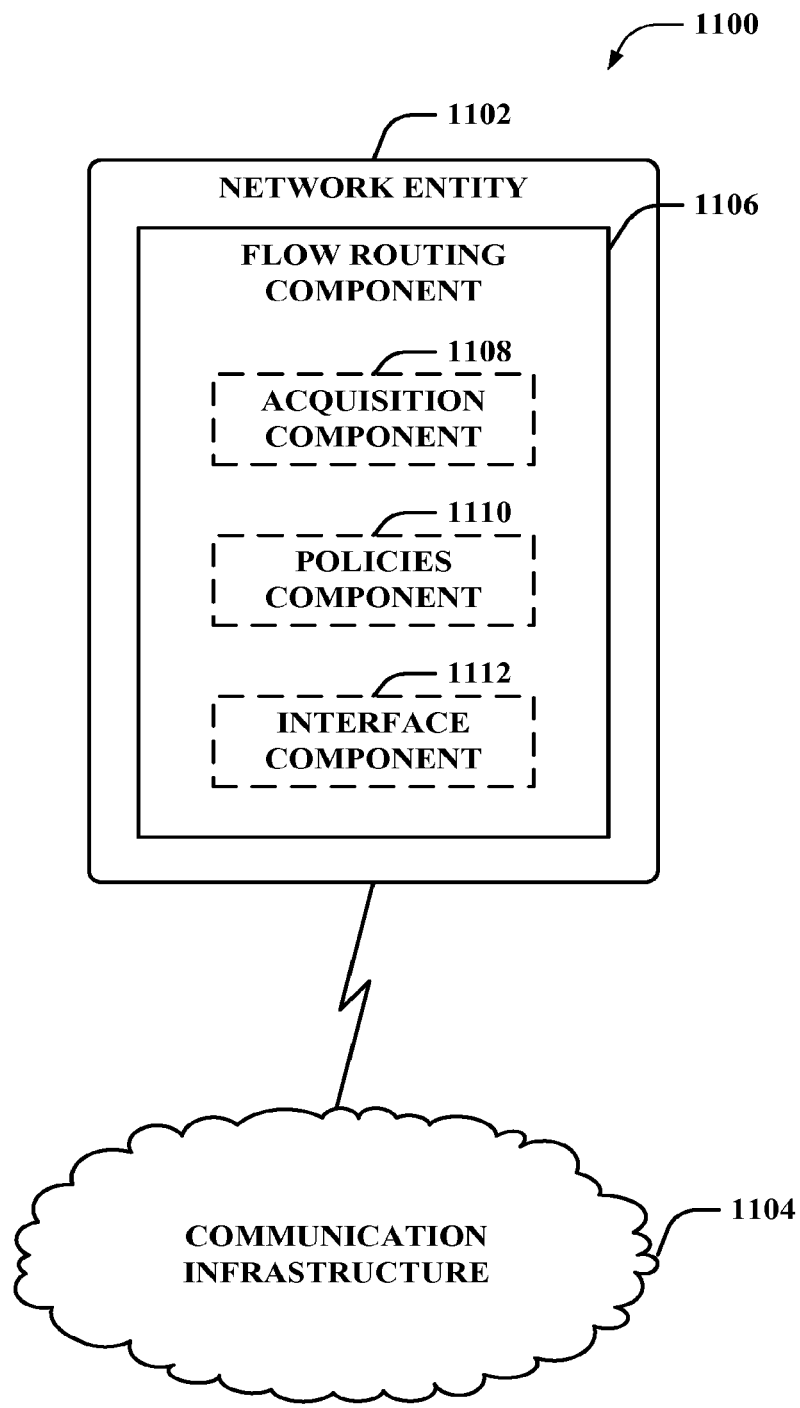
FIG. 11 illustrates an example system for multiple registration and flow based mobility in accordance with an aspect of the subject specification.

Focusing on FIG. 11, an example system for multiple registration and flow based mobility is illustrated in accordance with an aspect of the subject innovation. The system includes a network entity 1102 that is in communication with a communication infrastructure 1104 (e.g., wireless communication network, etc.). The network entity 1102 can include but is not limited to a UE, a PCRF server, or a HA/PGW. In addition, the network entity 1102 includes a flow routing component 1106 that determines the routing of one or more IP flows through one or more available access networks. As discussed previously, the access networks can include virtually any radio access technology, such as LTE, WLAN, etc. The flow routing component 1106 determines the IP flow routing based on a set of criteria, including but not limited to QoS requirements, bandwidth requirements, available radio access technology, network congestion, and so forth.

The flow routing component 1106 includes an acquisition component 1108, a policies component 1110, and an interface component 1112. The acquisition component 1108 can receive, collect, or otherwise obtain data regarding the available radio access technologies, network performance, quality of service requirements, bandwidth requirements, and most any other data relevant to determining the routing of IP flows. For example, the network entity 1102 can be a PCRF server, wherein the acquisition component 1108 can obtain data regarding the active IP flows, active QoS rules, a UE's HoA, CoAs, and so forth.

The policies component 1110 maintains one or more policies used in determining the routing of one or more IP flows by the flow routing component 1106. For example, a first policy may dictate that low value high volume traffic (e.g., data downloads) should be dynamically rerouted from an LTE network to a WLAN whenever the WLAN is available. Additionally or alternatively, the policies component 1110 can dynamically determine policies, or locate relevant policies maintained elsewhere in the communication infrastructure 1104. The flow routing component 1106 utilizes the data obtained via the acquisition component 1108, and the policies from the policies component 1110 to determine IP flow routing based.

In addition, the interface component 1112 provides various adapters, connectors, channels, communication paths, etc. to integrate the flow routing component 1106 into virtually any operating and/or database system(s). In addition, the interface component 1112 can provide various adapters, connectors, channels, communication paths, etc., that provide for interaction with the flow routing component 1106. It is to be appreciated that although the interface component 1112 is incorporated into the flow routing component 1106, such implementation is not so limited. For instance, the interface component 1112 can be a stand-alone component to receive or transmit data in relation to the system 1100. In particular, the interface component 1112 can receive any data relating to a device that is associated with the system 1100.

Figure 12:
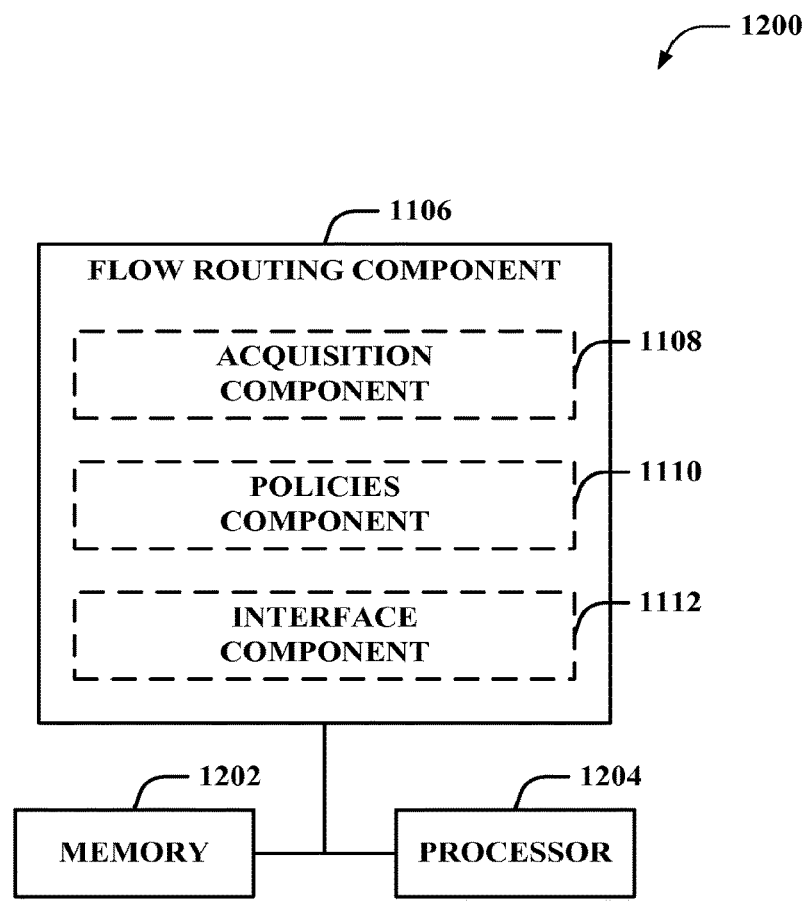
FIG. 12 illustrates an example block diagram of a internet protocol flow routing system in accordance with an aspect of the subject innovation.

FIG. 12 illustrates an example block diagram of a internet protocol flow routing system in accordance with an aspect of the subject innovation. The system 1200 includes a flow routing component 1106 that determines IP flow routing where a mobile node has access to multiple access networks. The flow routing component 1106 can determine the routing based on a plurality of criteria, including but not limited to available access technologies, network performance, QoS requirements, bandwidth requirements, and so forth. As discussed previously, the flow routing component 1106 includes an acquisition component 1108 that can obtain virtually any data relevant to the routing of IP flows, a policies component 1110 that facilitates implementation of one or more policies in routing determinations, and an interface component 1112 that enables the flow routing component 1106 to integrate into most any communication system.

System 1200 can additionally comprise memory 1202 that is operatively coupled to the flow routing component 1206 and that stores obtained data, policies, and so forth or information related to the obtained data, policies, and most any other suitable information related to facilitating flow routing. A processor 1204 can be operatively connected to the flow routing component 1206 (and/or memory 1202) to facilitate storing and/or communicating content and the like. It is to be appreciated that processor 1204 can be a processor dedicated to implementing routes, analyzing data or policies, or setting policies, a processor that controls one or more components of system 1200, and/or a processor that implements policies, analyzes data or policies, or sets policies, and controls one or more components of system 1200.

Figure 13:
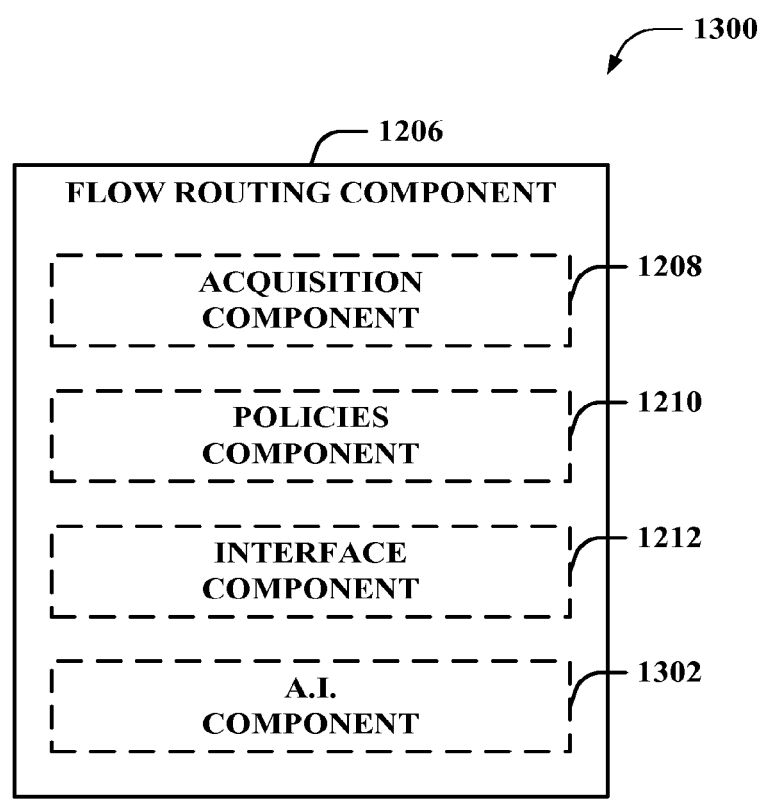
FIG. 13 illustrates a system that employs an artificial intelligence component which facilitates automating one or more features in accordance with the present specification.

FIG. 13 illustrates a system 1300 that employs an artificial intelligence (AI) component 1302 which facilitates automating one or more features in accordance with the subject innovation. The subject innovation (e.g., in connection with inferring) can employ various AI-based schemes for carrying out various aspects thereof. For example, a process for dynamically routing IP flows can be facilitated via an automatic classifier system and process.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions there from. For instance, by observing that one user interacts with a subset of other users over a network, it may be determined or inferred that this subset of users belongs to a desired social network of interest for the one user as opposed to a plurality of other users who are never or rarely interacted with.

Directed and undirected model classification approaches including, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 14:
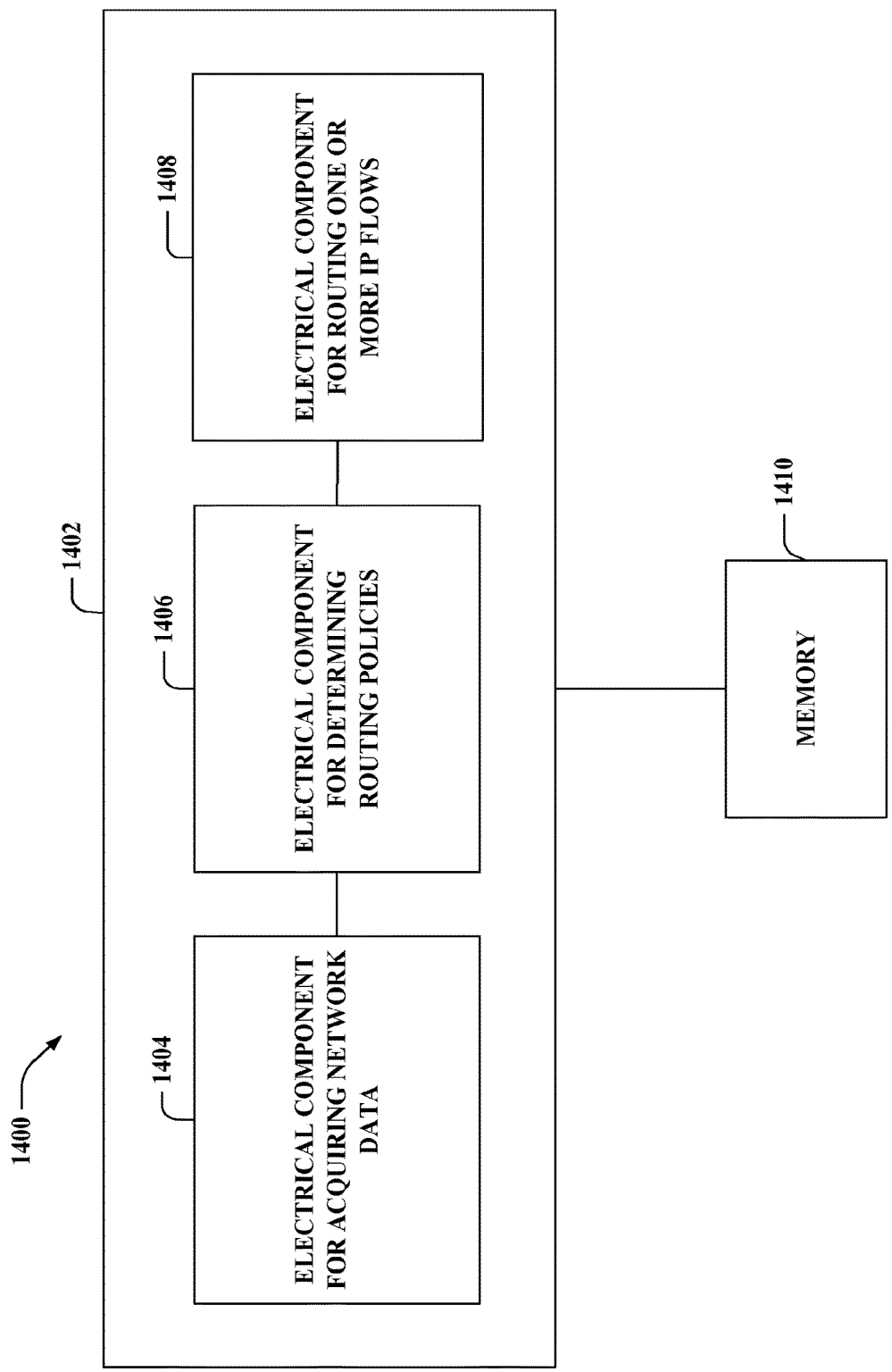
FIG. 14 is an illustration of an example system that facilitates multiple registrations and flow based mobility in a wireless communication network in accordance with the subject specification.

With reference to FIG. 14, illustrated is a system 1400 that facilitates routing internet protocol flows in a wireless communication network. For example, system 1400 can reside at least partially within a mobile device, a home agent/p-gateway, a policy and charging rule function server, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for acquiring network data related to the routing of IP flows 1404 in the wireless communication network. Further, logical grouping 1402 can comprise an electrical component for determining routing policies based at least in part on the acquired network data 1406. Moreover, the logical grouping 1402 can include an electrical component for dynamically routing one or more IP flows in the wireless communication network 1608. Additionally, system 1400 can include a memory 1410 that retains instructions for executing functions associated with electrical components 1404, 1406, and 1408. While shown as being external to memory 1410, it is to be understood that one or more of electrical components 1404, 1406, and 1408 can exist within memory 1410.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for internet protocol flow routing in a communication network, comprising:

determining at least one policy that indicates which of a plurality of access networks to use for routing each of a plurality of internet protocol flows;

determining routing for the plurality of internet protocol flows through the plurality of access networks based at least in part on the at least one policy; and sending a binding update to a network entity, the binding update comprising a distinct flow identifier number for each of the plurality of internet protocol flows, wherein the binding update further comprises a plurality of binding identifiers, wherein each binding identifier is associated with a distinct internet protocol flow of the plurality of internet protocol flows, and wherein the plurality of binding identifiers comprises:

a first binding identifier that is associated with a first instruction to bind a home address of a mobile terminal, a first internet protocol address assigned by a first access network, and a first flow identifier; and a second binding identifier that is associated with a second instruction to bind the home address of the mobile terminal, a second internet protocol address assigned by a second access network, and a second flow identifier.

2. The method of claim 1, wherein determining the at least one policy, determining the routing, and sending the binding update are performed by the mobile terminal.

3. The method of claim 2, wherein the binding update is sent when the mobile terminal is simultaneously connected to the plurality of access networks.

4. The method of claim 1, wherein the network entity comprises a home agent.

5. The method of claim 1, wherein the at least one policy comprises at least one of quality of service requirements and bandwidth requirements.

6. The method of claim 1, further comprising receiving a binding acknowledgment from the network entity.

7. The method of claim 1, further comprising:

associating with a first access gateway that enables the mobile terminal to communicate with the first access network of the plurality of access networks; and associating with a second access gateway that enables the mobile terminal to communicate with the second access network of the plurality of access networks.

8. The method of claim 1, wherein the plurality of access networks comprises a mobile wireless communication network and a wireless local area network.

9. An apparatus for internet protocol flow routing in a communication network, comprising:

a processor;

memory in electronic communication with the processor; and instructions stored in the memory, the instructions being executable by the processor to:

determine at least one policy that indicates which of a plurality of access networks to use for routing each of a plurality of internet protocol flows;

determine routing for the plurality of internet protocol flows through the plurality of access networks based at least in part on the at least one policy; and send a binding update to a network entity, the binding update comprising a distinct flow identifier number for each of the plurality of internet protocol flows, wherein the binding update further comprises a plurality of binding identifiers, wherein each binding identifier is associated with a distinct internet protocol flow of the plurality of internet protocol flows, and wherein the plurality of binding identifiers comprises:

a first binding identifier that is associated with a first instruction to bind a home address of a mobile terminal, a first internet protocol address assigned by a first access network, and a first flow identifier; and a second binding identifier that is associated with a second instruction to bind the home address of the mobile terminal, a second internet protocol address assigned by a second access network, and a second flow identifier.

10. The apparatus of claim 9, wherein the apparatus comprises the mobile terminal.

11. The apparatus of claim 10, wherein the binding update is sent when the mobile terminal is simultaneously connected to the plurality of access networks.

12. The apparatus of claim 9, wherein the network entity comprises a home agent.

13. The apparatus of claim 9, wherein the at least one policy comprises at least one of quality of service requirements and bandwidth requirements.

14. The apparatus of claim 9, wherein the instructions comprise instructions executable by the processor to receive a binding acknowledgment from the network entity.

15. The apparatus of claim 9, wherein the instructions comprise instructions executable by the processor to:
associate with a first access gateway that enables the mobile terminal to communicate with the first access network of the plurality of access networks; and
associate with a second access gateway that enables the mobile terminal to communicate with the second access network of the plurality of access networks.

16. The apparatus of claim 9, wherein the plurality of access networks comprises a mobile wireless communication network and a wireless local area network.

17. An apparatus for internet protocol flow routing in a communication network, comprising:
means for determining at least one policy that indicates which of a plurality of access networks to use for routing each of a plurality of internet protocol flows;
means for determining routing for the plurality of internet protocol flows through the plurality of access networks based at least in part on the at least one policy; and
means for sending a binding update to a network entity, the binding update comprising a distinct flow identifier number for each of the plurality of internet protocol flows, wherein the binding update further comprises a plurality of binding identifiers, wherein each binding identifier is associated with a distinct internet protocol flow of the plurality of internet protocol flows, and wherein the plurality of binding identifiers comprises:
a first binding identifier that is associated with a first instruction to bind a home address of a mobile terminal, a first internet protocol address assigned by a first access network, and a first flow identifier; and
a second binding identifier that is associated with a second instruction to bind the home address of the mobile terminal, a second internet protocol address assigned by a second access network, and a second flow identifier.

18. The apparatus of claim 17, wherein the at least one policy comprises at least one of quality of service requirements and bandwidth requirements.

19. The apparatus of claim 17, wherein the plurality of access networks comprises a mobile wireless communication network and a wireless local area network.

20. A non-transitory tangible computer-readable medium having instructions thereon, the instructions comprising:
code for causing a wireless communication device to determine at least one policy that indicates which of a plurality of access networks to use for routing each of a plurality of internet protocol flows;
code for causing the wireless communication device to determine routing for the plurality of internet protocol flows through the plurality of access networks based at least in part on the at least one policy; and
code for causing the wireless communication device to send a binding update to a network entity, the binding update comprising a distinct flow identifier number for each of the plurality of internet protocol flows, wherein the binding update further comprises a plurality of binding identifiers, wherein each binding identifier is associated with a distinct internet protocol flow of the plurality of internet protocol flows, and wherein the plurality of binding identifiers comprises:
a first binding identifier that is associated with a first instruction to bind a home address of a mobile terminal, a first internet protocol address assigned by a first access network, and a first flow identifier; and
a second binding identifier that is associated with a second instruction to bind the home address of the mobile terminal, a second internet protocol address assigned by a second access network, and a second flow identifier.

21. The non-transitory tangible computer-readable medium of claim 20, wherein the at least one policy comprises at least one of quality of service requirements and bandwidth requirements.

22. The non-transitory tangible computer-readable medium of claim 20, wherein the plurality of access networks comprises a mobile wireless communication network and a wireless local area network.

* * * * *